United States Patent [19]

Hanson, Jr.

[11] Patent Number: 4,493,442

[45] Date of Patent: Jan. 15, 1985

[54] VARIABLE RATE FOOD INGREDIENT DELIVERY APPARATUS

[75] Inventor: Harold W. Hanson, Jr., Newport Beach, Calif.

[73] Assignee: Par-Way Manufacturing Co., Los Angeles, Calif.

[21] Appl. No.: 282,864

[22] Filed: Jul. 13, 1981

[51] Int. Cl.$^3$ .............................................. G01F 11/20
[52] U.S. Cl. ................................. 222/241; 222/412; 222/486
[58] Field of Search ............... 222/330, 331, 410, 412, 222/413, 311, 241, 553, 414, 625, 522, 549, 486

[56] References Cited

U.S. PATENT DOCUMENTS

| | | | |
|---|---|---|---|
| 110,595 | 12/1870 | Sheplar et al. | 222/412 X |
| 1,546,411 | 7/1925 | Short | 222/486 |
| 2,056,239 | 10/1936 | Walter | 222/413 X |
| 2,798,643 | 7/1957 | Arnett et al. | 222/333 X |
| 2,957,608 | 10/1960 | Wahl | 222/412 X |
| 2,961,126 | 11/1960 | Craig | 222/330 X |
| 3,001,633 | 9/1961 | Heitshu | 222/412 X |
| 3,031,064 | 4/1962 | Kline | 198/861 X |
| 3,115,276 | 12/1963 | Johanningmeier | 222/413 X |
| 3,342,315 | 9/1967 | Godley | 198/671 |
| 3,435,804 | 4/1969 | Orlowski | 222/553 X |
| 3,899,135 | 8/1975 | O'Brian | 239/562 X |
| 4,141,508 | 2/1979 | van der Lely | 222/486 X |

Primary Examiner—David A. Scherbel
Assistant Examiner—Russell D. Stormer
Attorney, Agent, or Firm—Pretty, Schroeder, Brueggemann & Clark

[57] ABSTRACT

An apparatus for evenly distributing powdered and granular food product ingredients at a controlled and variable rate. A delivery tube communicates with the interior of a hopper that holds a supply of the ingredient and an auger causes the ingredient to move from the hopper and axially along the tube. The auger has a central body with a large diameter portion extending through the hopper, a small diameter portion disposed within the tube and a land extending along and around the body to define a generally helical flute that serves as an ingredient flow path of variable cross-sectional area. A series of non-circular openings arranged along the tube allow the ingredient to escape in a uniform manner, the effective size of the openings being variable by changing the relative rotational positions of the tube and an apertured sleeve that surrounds the tube. The positions of the openings is also variable by rotating the tube and the sleeve together to further improve the uniformity of distribution.

15 Claims, 7 Drawing Figures

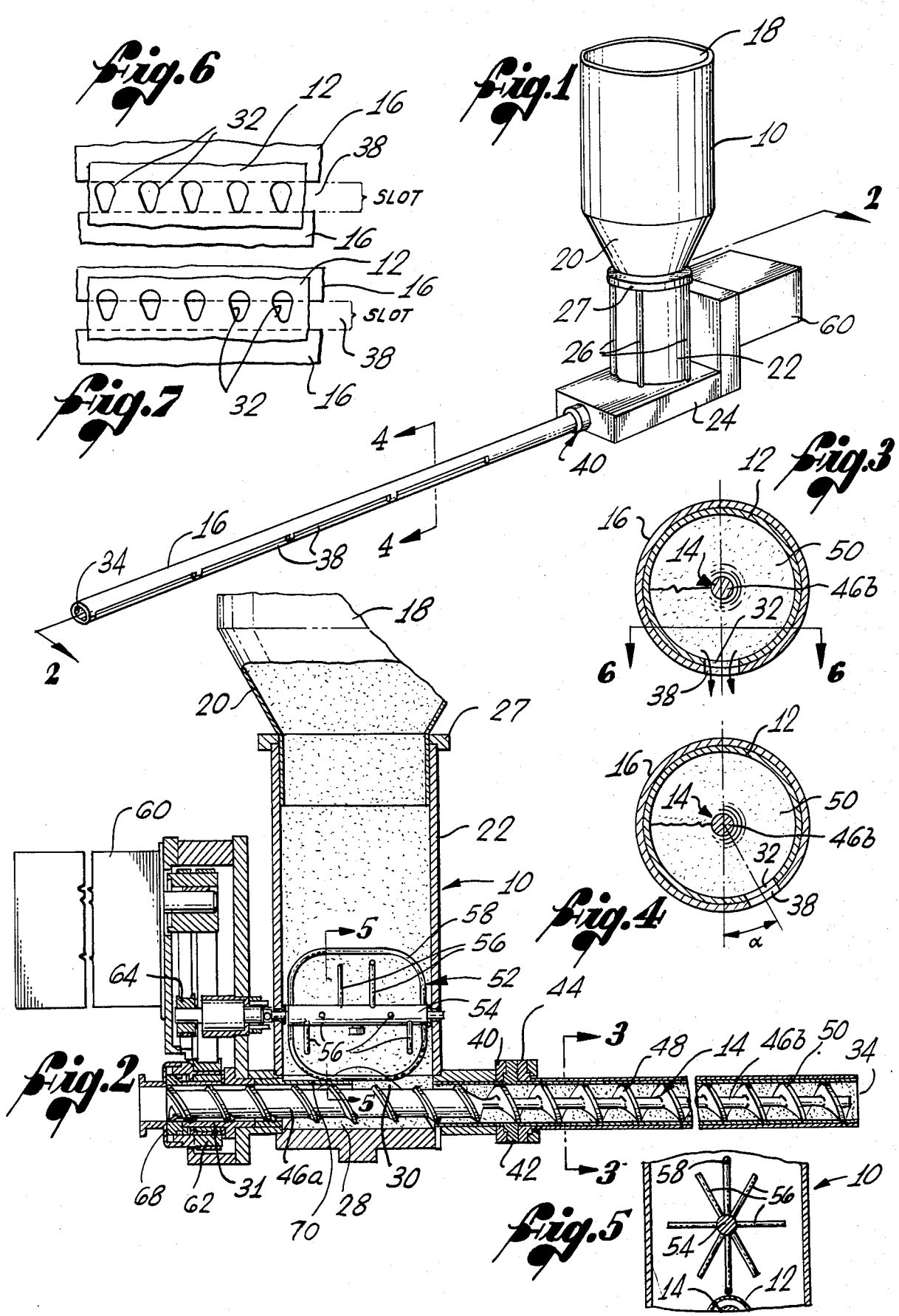

VARIABLE RATE FOOD INGREDIENT DELIVERY APPARATUS

FIELD OF THE INVENTION

The present invention relates to apparatus for evenly distributing a powdered or granular food product ingredient at a controlled and variable rate and, more particularly, to such an apparatus in which the ingredient is moved through an apertured delivery tube by the rotation of an auger.

BACKGROUND OF THE INVENTION

Granular and powdered food ingredients, such as salt, cheese and crushed nuts, are often applied to food products by moving the ingredients from a hopper along a horizontal tube from which they are dispensed through a series of openings. Rotation of an auger within the tube produces the lateral movement of the ingredient.

A difficult problem associated with such devices is the lack of a satisfactory provision for adjusting the rate at which the ingredient is dispensed from the tube while maintaining the uniformity of the output. It is conventional to adjust the output by varying the rotational speed of the auger, but it is generally found that with a slow rotation of the auger and a low rate of output a disproportionately small amount of ingredient reaches the end of the tube farthest from the hopper. It has also been found that a pattern of high and low ingredient density points may exist along the tube when the auger turns slowly. For example, the ingredient may emerge at alternate openings at a relatively high rate. An improved mechanism is, therefore, needed to insure both a uniform output of the ingredient throughout the length of the tube and a rate of ingredient output that can be varied over a wide range for both fine and coarse ingredients. Such a mechanism should also avoid the problem of clogging the auger with ingredient material that does not move transversely.

SUMMARY OF THE INVENTION

The present invention resides in an apparatus for the distribution of powdered or granular food product ingredients that accomplishes the above objectives. The ingredients are transported laterally along a delivery tube by an auger having a central body of non-uniform diameter. A large diameter portion of the body extends into a hopper from which the ingredient is supplied while a smaller diameter portion is disposed within the tube. A land extends along and around the central body in a generally helical manner defining a flute that serves as an ingredient flow path that is of a smaller cross-sectional area along the larger diameter portion and of larger cross-sectional area along the smaller diameter portion.

According to another aspect of the invention, the tube is provided with openings through which the ingredient is dispensed. An apertured sleeve surrounds the tube and the sleeve can be positioned so that the apertures expose more or less of the tube openings. By selecting the proper sleeve position relative to the tube position, it is possible to restrict the effective size of the openings so that enough ingredient will reach the far end of the tube to produce a uniform output. Preferably the tube openings are teardrop shaped, having their narrow ends pointed in a circumferential direction. Both the tube and the sleeve may be made rotatable so that the angular position of the openings can be adjusted.

Preferably the auger extends across the bottom of the hopper and is connected to a variable speed motor on the opposite side of the hopper. The rate of output is varied by changing the speed of the motor.

The auger can be received by a cylindrical chamber that extends from the hopper in the opposite direction from the tube, with an ingredient seal encircling the auger at the end of the chamber. The auger tends to move the ingredient away from the seal, thereby minimizing wear and deterioration of the seal. A shield can cover the portion of the auger adjacent to the chamber to further inhibit movement of the ingredient toward the seal.

These and other advantages of the present invention will be apparent from the following detailed description, taken in conjunction with the accompanying drawings which illustrate, by way of example, the principles of the invention.

BRIEF DESCRIPTION OF THE DRAWINGS

FIG. 1 is a perspective view of a food ingredient distribution apparatus constructed in accordance with the present invention;

FIG. 2 is a fragmentary cross-sectional view of the apparatus taken substantially along the line 2—2 of FIG. 1;

FIGS. 3 and 4 are enlarged, transverse, cross-sectional views of the tube, sleeve and auger of the apparatus taken substantially as indicated by the line 4—4 of FIG. 1, the openings being directed downwardly in FIG. 3 and to one side in FIG. 4 (as shown in FIG. 1);

FIG. 5 is an enlarged cross-sectional view of a fragmentary portion of the hopper taken vertically and showing an agitator; and FIGS. 6 and 7 are enlarged fragmentary views taken from inside the tube, as indicated by the line 6—6 of FIG. 3, showing the sleeve opening in various angular positions.

DETAILED DESCRIPTION OF THE PREFERRED EMBODIMENT

The present invention resides in an exemplary apparatus, shown in FIGS. 1–7 of the accompanying drawings, that embodies many advantages of the present invention. It is used for the distribution of a wide variety of powdered and granular food product ingredients such as salt, powdered cheese and crushed nuts. In general, it includes a hopper 10, a delivery tube 12, an auger 14 within the tube, and an adjustment sleeve 16 surrounding the tube.

The hopper 10 in which the ingredient is stored is circular in horizontal cross section and has an open top end through which more ingredient can be added. It has a relatively large cylindrical upper portion 18 connected by an integrally formed conical mid-portion 20 to a smaller lower portion 22 that is cylindrical and concentric with the upper portion. The lower portion 22 is formed by a transparent glass barrel.

The hopper 10 also includes a metal base 24, the upper portion 18 being secured directly to the base by four vertical tie rods 26 (three of which are visible in FIG. 1). The lower section 22 is clamped in place between the base 24 and a flange 27 on the bottom of the mid-section 20. Since the lower section 22 is transparent, downward flow of the ingredient can be observed and any obstruction or clogging is easily detected.

Positioned within the base 24, across the open bottom end of the lower section 22, is a saddle-shaped plastic bottom member 28 that is circular in cross section to fit into the lower section 22 and has an upwardly facing concave surface 30. The auger 14, also plastic, extends from the tube 12 through the hopper base 24 and into a cylindrical chamber 31 opposite the tube so that the auger lies across a trough defined by the concave surface 30. As the auger 14 turns, it picks up ingredient fed to it by the concave surface 30 and transports it axially and laterally along the tube 12.

The tube 12 is provided with a single row of openings 32 that extends longitudinally along its side from its outer end, the openings serving as outlets for the ingredient, the openings being spaced throughout a distribution zone where the ingredient is to be delivered. Each opening 32 is teardrop shaped, having its wide end at the top and its narrow end pointing circumferentially with respect to the tube 12.

As the ingredient moves along the tube 12, it passes through the openings 32, the output of each opening being substantially equal to that of the others. The outer end 34 of the tube 12 is unobstructed to allow any ingredient that does not escape through the openings 32 to be collected for recycling without jamming the mechanism.

The adjustment sleeve 16, which is cylindrical like the tube 12 and coaxial with the tube, is provided with a single row of apertures in the form of elongated, longitudinal slots 38 that extend across the openings 32 of the tube 12. As the ingredient is dispensed, it must pass through both the openings 32 in the tube 12 and the slots 38 in the sleeve 16.

Each slot 38 is wide enough to encompass an entire tube opening 32 when the sleeve 16 occupies its fully open position (as shown in FIG. 6). The sleeve 16 can, however, be rotated so that the tops of the slots 38 pass the tops of the tube openings 32 (as shown in FIG. 7), thereby reducing the effective size of the openings 32 through which ingredient can escape.

If the sleeve 16 is rotated to a position in which only a relatively small portion of each tube opening 32 is exposed (as shown in FIG. 3), the tapered shape of the tube openings takes on considerable importance. Despite the fact that the vertical dimension of the effective or composite opening is greatly reduced, this composite or effective opening retains a shape of approximately equal height and width because the greatest horizontal dimension of the exposed portion of the tube openings 32 is also reduced, its narrow end being uncovered.

Not only is it possible to rotate the sleeve 16 relative to the hopper 10, but it is also possible to rotate the tube 12. Thus, relative rotation between the tube 12 and the sleeve 16 varies the effective size of the openings 32, while joint rotation of the tube 12 and the sleeve cause the openings to be displaced angularly. As shown in FIG. 3, the openings 32 are located at the bottom of the tube 12. In FIG. 4 they have been rotated through an angle α and to a higher more vertical position. The openings 32 can be displaced in either direction and it is sometimes desirable to rotate them until the angle α is 90 degrees and the openings are vertical. Movement of the openings 32 toward the vertical position tends to reduce any disproportionate discharge of the ingredient through the openings nearest the hopper 10, particularly in case of a finely ground ingredient being delivered at a low rate.

Once the desired rotational position of the tube 12 and the sleeve 16 have been selected, the tube and sleeve are secured in that position by a collar 40 mounted on the base 24 (as best shown in FIG. 2). The collar 40 is tightened, causing it to clamp a first flange 42 attached to the tube 12 and a second flange 44 attached to the sleeve 16.

Another important structural aspect of the apparatus that cooperates with the arrangement, configuration and position of the openings 32 to improve the uniformity of ingredient distribution is the configuration of the auger 14. It has a central body 46 around which a land 48 is wound, defining a generally helical flute that serves as an ingredient flow path. The outside diameter of the auger 14, as defined by the outer edge 50 of the land 48 is constant throughout the length of the auger 14. However, the central body 46 is not of uniform diameter. Instead, it includes a large diameter portion 46a that extends through the hopper 10 into the beginning of the tube 12, and a small diameter portion 46b that is disposed within the remainder of the tube 12. Most of the tube 12 is occupied by the small diameter portion 46b.

Along the large diameter portion 46a of the auger 16, the ingredient flow path is of relatively small depth cross-sectional area. However, in the region of the small diameter central body 46b, the depth and cross-sectional area of the flow path are much larger.

Disposed directly above the auger 14 within the hopper 10 is an agitator 52 which includes a rotatable shaft 54 axially aligned with the auger. Projecting radially from the shaft 54 are a plurality of stirring rods 56. In addition, a hoop-like member 58 is joined to the ends of the shaft 54 to rotate with the stirring rods 56.

A variable speed electric motor 60 is mounted on the base 24 of the hopper 10 on the opposite side of the hopper from the tube 12 (see FIGS. 2 and 5). The motor 60 drives the auger 14 through a first pulley 62 and it drives the agitator 52 through a second pulley 64.

At the end of the hopper 10 opposite the tube 12, the auger 14 projects into the elongated cylindrical chamber 31. An ingredient seal 68 surrounds the auger 14 at the inner end of the chamber 31 to prevent escape of the ingredient material. However, rotation of the auger 14 tends to move the ingredient out of the chamber 31 and away from the seal 68, thus preventing the ingredient from excessively wearing the seal by a grinding or abrasive action. Movement of the ingredient into the chamber 31 is further exhibited by a shield 70 that projects from the mouth of the chamber over the top of the auger 14 in the lower portion 22 of the hopper 10, the shield being spaced from the far side of the hopper and the tube 12.

In the operation of the apparatus, its total output is generally determined by the speed at which the auger 14 is driven by the motor 60. Uniformity of that output among the various tube openings 32 is attained by adjusting size and position of the openings. The effective size of the openings 32 nearest the hopper 10 should be small enough so that an adequate amount of ingredient reaches the far end of the tube for uniform distribution of the output.

The relatively small cross section of the ingredient flow path along the portion of the auger 14 having the large diameter central body 46a is believed to contribute to an even distribution of the ingredient along the auger. The ingredient is loose at the other end of the auger 14 and it has been found that the ingredient does not become packed in the flow path and clogging does not occur. It has also been found that the ingredient is not distributed in an alternating or repeating pattern.

As will be apparent from the above description, the present invention possesses many important operating advantages when compared to earlier devices of a similar nature. Nevertheless, it is of simple inexpensive construction with a minimum number of components. While a particular form of the invention has been illustrated and described, it will be apparent that various modifications can be made without departing from the spirit and scope of the invention.

I claim:

1. An apparatus for uniformly distributing a powdered or granular food product ingredient along a distribution zone of substantial length at a controlled variable rate comprising:
   a hopper for holding a supply of said ingredient to be distributed;
   a cylindrical tube extending from said hopper and communicating with the interior thereof, said tube having one or more openings through which said ingredient can pass arranged longitudinally therealong and extending throughout said distribution zone;
   an auger disposed within said tube and said hopper to transport said ingredient from said hopper along said tube for distribution through said openings at a substantially uniform rate throughout said distribution zone, said auger including a central body having a relatively large diameter portion which extends into said hopper and a relatively small diameter portion which is disposed entirely within said tube extending along said distribution zone and not extending into said hopper, said auger further comprising a land extending around said central body and defining a generally helical flute to serve as an ingredient flow path, said flute having a relatively small cross-sectional area along said large diameter portion of said central body and a relatively large diameter portion along said small diameter portion of said central body; and
   drive means for rotating said auger at a variable and adjustable speed to cause said ingredient to move longitudinally along said tube at a selected rate.

2. The apparatus of claim 1 further comprisng means for varying the effective size of said openings to achieve a uniform rate at which said ingredient is dispensed from said tube.

3. The apparatus of claim 2 wherein said means for varying the effective size of said openings comprises a rotatable sleeve having one or more apertures therein, said sleeve being disposed coaxially with respect to said tube and surrounding said tube.

4. The apparatus of claim 3 wherein said openings in said tube are non-circular, each having a narrow end.

5. The apparatus of claim 4 wherein said apertures in said sleeve are elongated slots extending longitudinally therealong.

6. The apparatus of claim 1 wherein at least some of said openings in said tube are non-circular, each having a narrow end pointed in a circumferential direction.

7. The apparatus of claim 1 wherein said drive means is a motor disposed on the opposite side of said hopper from said tube, said auger extending through said hopper into engagement with said motor.

8. The apparatus of claim 1 further comprising a shield disposed within said hopper, spaced from said tube and above said auger.

9. The apparatus of claim 1 further comprising:
   a cylindrical chamber extending from said hopper away from said tube and in alignment therewith, said auger extending into said chamber; and
   a seal surrounding said chamber at an end thereof farthest from said tube, whereby said auger tends to move said ingredient away from said seal.

10. An apparatus for uniformly distributing a powdered or granular food product ingredient along a distribution zone of substantial length at a controlled variable rate comprising:
    a hopper for holding a supply of said ingredient to be distributed;
    a rotatable cylindrical tube extending from said hopper and communicating with the interior thereof, said tube having one or more openings through which said ingredient can pass arranged longitudinally therealong and extending through said distribution zone;
    a rotatable sleeve surrounding said tube having apertures therein, said apertures being alignable with said openings;
    means for locking said tube and said sleeve in selected rotational positions, whereby the effective size and the angular positions of said openings are adjustable;
    an auger disposed within said tube and said hopper to transport said ingredient from said hopper along said tube for distribution through said openings at a substantially uniform rate throughout said distribution zone, said auger including a central body having a relatively small diameter portion which is disposed entirely within said tube extending along said distribution zone and not extending into said hopper, said auger further comprising a land extending around said central body and defining a generally helical flute to serve as an ingredient flow path, said flute having a relatively small cross-sectional area along said large diameter portion of said central body and a relatively large cross-sectional area along said small diameter portion of said central body; and
    drive means for rotating said auger at a variable and adjustable speed to cause said ingredient to move longitudinally along said tube at a selected rate.

11. The apparatus of claim 10 wherein said openings effectively defined by said tube and said sleeve are non-circular, each having a narrow end pointed in a circumferential direction.

12. The apparatus of claim 10 wherein said drive means is a motor disposed on the opposite side of said hopper from said tube, said auger extending through said hopper into said engagement with said motor.

13. The apparatus of claim 10 further comprising a shield disposed within said hopper, spaced from said tube and above said auger.

14. The apparatus of claim 10 further comprising:
    a cylindrical cavity extending from said hopper away from said tube and in alignment therewith, said auger extending into said cavity; and
    a seal surrounding said cavity at an end thereof farthest from said tube, whereby said auger tends to move said ingredient away from said seal.

15. An apparatus for uniformly distributing a powdered or granular food product ingredient along a distribution zone of substantial length at a controlled variable rate comprising:

- a hopper for holding a supply of said ingredient to be distributed;
- a rotatable cylindrical tube extending from said hopper and communicating with the interior thereof, said tube having a plurality of circumferentially pointed, non-circular openings through which said ingredient can pass arranged longitudinally therealong and extending throughout said distribution zone;
- a rotatable sleeve surrounding said tube having apertures being alignable with said openings;
- means for locking said tube and said sleeve in selected rotational positions, whereby the effective size and the angular positions of said openings are adjustable;
- an auger disposed within said tube and said hopper to transport said ingredient along said tube for distribution through said openings at a substantially uniform rate throughout said distribution zone, said auger including a central body having a relatively large diameter portion which extends into said hopper and a relatively small diameter portion which is disposed entirely within said tube extending along said distribution zone and not extending into said hopper, said auger further comprising a land extending along and around said central body and defining a generally helical flute to serve as an ingredient flow path, said flute having a relatively small cross-sectional area along said large diameter portion of said central body and a relatively large cross-sectional area long said small diameter portion of said central body;
- a cylindrical chamber extending from said hopper away from said tube and in alignment therewith, said auger extending into said chamber;
- a seal disposed within said chamber and surrounding said auger at an end thereof farthest from said tube, whereby said auger tends to move said ingredient away from said seal;
- a shield disposed within said hopper, spaced from said tube and above said auger; and
- drive means for rotating said auger at a variable and adjustable speed to cause said ingredient to move longitudinally along said tube at a selected rate.

* * * * *